United States Patent
Ota et al.

(10) Patent No.: US 6,375,918 B1
(45) Date of Patent: Apr. 23, 2002

(54) METHOD AND DEVICE FOR CONTINUOUSLY BURNING POWDER CARBON

(75) Inventors: Masahiro Ota; Yasushi Mitsuyama, both of Kobe; Masaharu Nishimura; Shinya Ishii, both of Takasago; Naohiko Matsuda; Ichirou Yamashita, both of Hiroshima, all of (JP)

(73) Assignee: Mitsubishi Heavy Industries, Ltd. (JP)

(*) Notice: Subject to any disclaimer, the term of this patent is extended or adjusted under 35 U.S.C. 154(b) by 0 days.

(21) Appl. No.: 09/424,303

(22) PCT Filed: Mar. 25, 1999

(86) PCT No.: PCT/JP99/01523
§ 371 Date: Nov. 22, 1999
§ 102(e) Date: Nov. 22, 1999

(87) PCT Pub. No.: WO99/50178
PCT Pub. Date: Oct. 7, 1999

(30) Foreign Application Priority Data

Mar. 27, 1998 (JP) .......................................... 10-080649

(51) Int. Cl.[7] ............................ C01B 31/04; B01J 19/08

(52) U.S. Cl. .................. 423/448; 423/460; 422/186.05; 204/157.43

(58) Field of Search ................................ 423/448, 460, 423/445 R; 204/157.47, 157.43; 422/186.05

(56) References Cited

U.S. PATENT DOCUMENTS 3,993,739 A * 11/1976 Vanderveen ................. 423/460
5,246,554 A * 9/1993 Cha ........................ 204/157.3

FOREIGN PATENT DOCUMENTS

| JP | 51-022696 | 2/1976 | ............ C01B/31/08 |
| JP | 56-128592 | 10/1981 | ............ H05B/6/80 |
| JP | 57187035 A | 11/1982 | ............ B01J/19/08 |
| JP | 03183609 A | 8/1991 | ............ C01B/31/04 |

* cited by examiner

Primary Examiner—Stuart L. Hendrickson
(74) Attorney, Agent, or Firm—Myers Bigel Sibley & Sajovec

(57) ABSTRACT

A process for the continuous firing of powdered carbon which comprises firing powdered carbon continuously by feeding powdered carbon into a firing tube and applying microwaves to the top surface of a deposited layer of the powdered carbon so as to form a high-temperature fired layer within the deposited layer, and an apparatus therefor.

3 Claims, 6 Drawing Sheets

METHOD AND DEVICE FOR CONTINUOUSLY BURNING POWDER CARBON

This is a national stage application of PCT/JP/99/01523 filed Mar. 25, 1999.

TECHNICAL FIELD

This invention relates to a process for the continuous firing of powdered carbon and an apparatus therefor. More particularly, it relates to a process for firing powdered carbon continuously by the application of microwaves and an apparatus therefor.

BACKGROUND ART

Conventionally, in order to graphitize powdered carbon by firing, a furnace 20 illustrated in FIG. 6, which is called an Acheson furnace, has been used. First of all, a large number of graphite containers 21 are filled with a raw material comprising powdered carbon, arranged in furnace 20, and completely covered with a large amount of packing coke 22. After a heat shield lining 23 is placed around packing coke 22, containers 21 within furnace are collectively heated by passing an electric current therethrough for several days, so that the powdered carbon is raised in temperature and thereby fired. Thereafter, containers 21 are cooled by allowing them to radiate heat spontaneously over a period of several weeks. In this figure, reference numeral 24 designates furnace walls made of fire bricks; 25, graphite terminal electrodes; and 26, busbars.

Furnace 20 included in the above-described conventional firing apparatus is a heating furnace of the so-called batch type in which a firing operation cannot be started before the preceding one is completed.

As a result, this firing process involves the following problems.

(1) In the course of firing, components other than the fired product, i.e. packing coke 22 and heat shield lining 23 surrounding containers 21 within furnace 20, are concurrently heated together with the fired product, and thereafter cooled together with the fired product. This results in low thermal efficiency and hence an increased unit cost of electric power used for production.

(2) It takes several weeks to carry out the heating and firing step and the cooling step. If the operating time required for filling containers with powdered carbon and embedding these containers and the operating time required for taking out the containers are added thereto, it takes about one month to finish each firing operation for graphitization. This makes it difficult to meet a demand for increased production of powdered carbon.

(3) This firing process involves environmentally severe dusty operations such as the operation for filling with packing coke. Accordingly, even if one or more additional Acheson furnaces are installed in order to meet a demand for increased production of powdered carbon, it is difficult to secure personnel sufficient for the firing operation.

Consequently, the conventional firing process using an Acheson furnace has been unable to meet satisfactorily the demand of the battery market for increased production of powdered carbon which will hereafter be expected owing, for example, to the increased use of lithium batteries.

DISCLOSURE OF THE INVENTION

The present invention has been made in view of the above-described existing state of the art, and an object thereof is to provide a process for the continuous firing of powdered carbon which involves high thermal efficiency, can satisfactorily meet a demand for increased production of powdered carbon, and can be carried out with less operating personnel, as well as an apparatus therefor.

That is, in one aspect, the present invention provides a process for the continuous firing of powdered carbon which comprises firing powdered carbon continuously by feeding powdered carbon into a firing tube and applying microwaves to the top surface of a deposited layer of the powdered carbon so as to form a high-temperature fired layer within the deposited layer.

In another aspect, the present invention provides an apparatus for the continuous firing of powdered carbon which includes a firing tube disposed within a furnace, a powdered carbon feeding device for feeding powdered carbon continuously into the firing tube through one end thereof, a fired product withdrawing device for withdrawing a fired product of powdered carbon continuously from the other end of the firing tube, and one or more microwave waveguides extending into the furnace and serving to apply microwaves to the top surface of a deposited layer of powdered carbon fed into the firing tube and deposited therein, whereby the application of microwaves causes a high-temperature fired layer to be formed within the deposited layer of powdered carbon.

BEST MODE FOR CARRYING OUT THE INVENTION

One embodiment of the method for the continuous firing of powdered carbon in accordance with the present invention and the apparatus therefor will be more specifically described hereinbelow with reference to the accompanying drawings.

Figure 1:
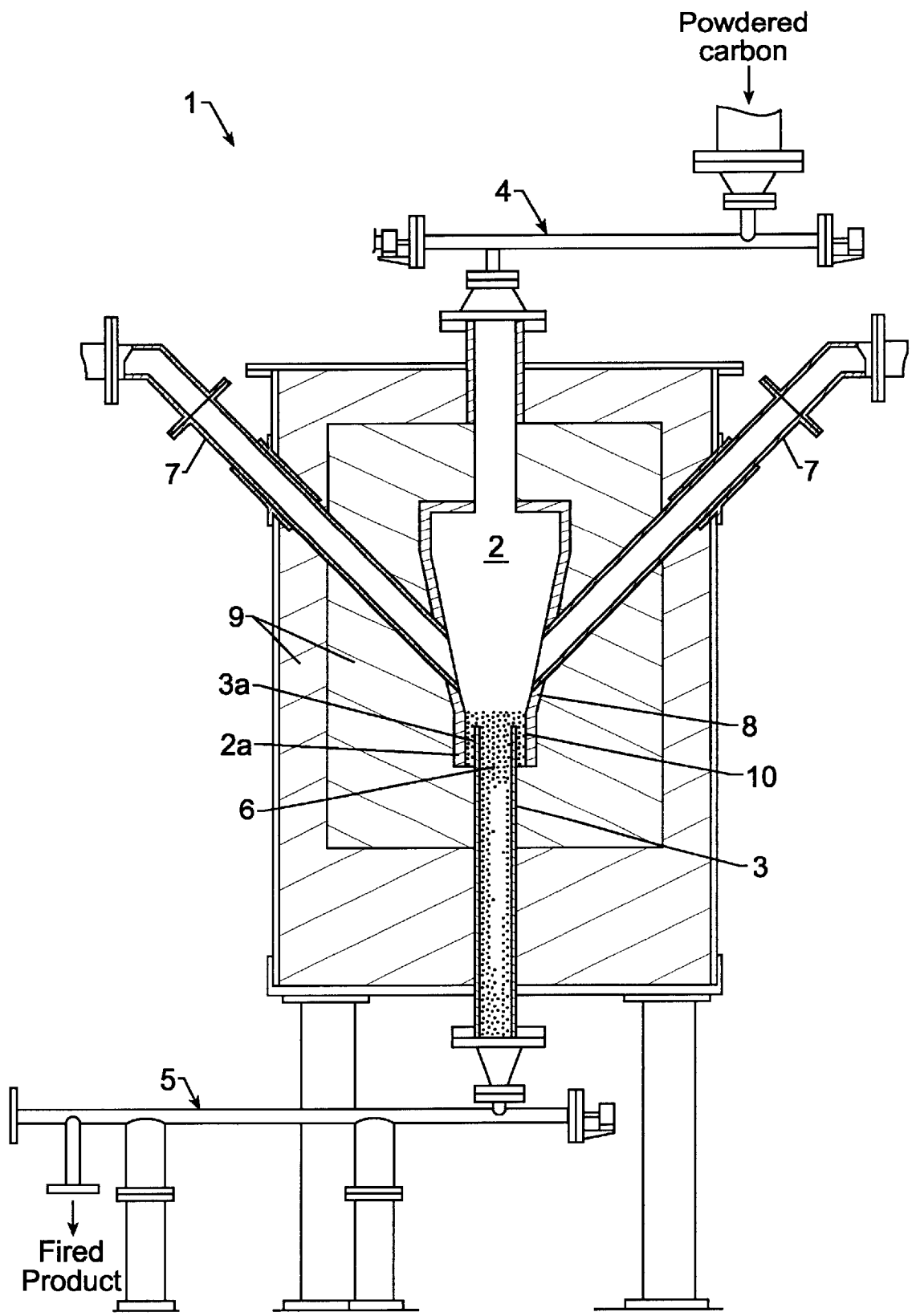
FIG. 1 is a schematic sectional view illustrating one embodiment of the apparatus for the continuous firing of powdered carbon in accordance with the present invention.

FIG. 1 illustrates one embodiment of the apparatus for the continuous firing of powdered carbon in accordance with the present invention.

As shown in this figure, the apparatus 1 for the continuous firing of powdered carbon includes a centrally positioned furnace 2, a firing tube 3 disposed below the furnace, a powdered carbon feeding device 4 provided above furnace 2 for feeding powdered carbon continuously into furnace 2, a fired product withdrawing device 5 provided below furnace 2 for withdrawing the fired product of powdered carbon continuously from the lower end of firing tube 3, and microwave waveguides 7 disposed so as to extend into furnace 2 and serving to apply microwaves, obliquely from above, to the top surface of a deposited layer 6 of powdered carbon deposited in firing tube 3.

No particular limitation is placed on the particle size of the powdered carbon used in the firing apparatus 1 of this embodiment, and any powdered carbon of ordinary particle size may be used.

Furnace 2 is configured so that its internal space is narrowed by its inner wall 8 as it goes downward and its lower part 2a has a cylindrical shape. Furnace 2 is surrounded by heat-insulating materials 9 having fire resistance.

The upper part 3a of firing tube 3 lies within the lower part 2a of furnace 2. The space between the upper part 3a of firing tube 3 and the lower part 2a of furnace 2 is filled with a portion of the powdered carbon introduced by means of powdered carbon feeding device 4 to form a heat-insulating powdered carbon layer 10. The lower part of firing tube 3 is reduced in heat-insulating capability, so that a region in which the temperature of the powdered carbon can be reduced to a non-firing temperature (i.e., the so-called temperature drop region) is formed. The feeding of raw material (i.e., powdered carbon) by powdered carbon feeding device 4 and the withdrawal of the fired product (i.e., fired carbon) by fired product withdrawing device 5 are continuously carried out in a well-balanced state, so that the deposited form of powdered carbon within firing tube 3 is kept unchanged.

Microwave waveguides 7 serve to apply microwaves to an area in the neighborhood of the upper part 3a of firing tube 3, and are provided in such a way that they are inclined downward and attached to the inner wall 8 of furnace 2. It is to be understood that, although a pair of (right and left) microwave waveguides 7 are provided in this embodiment, the present invention is not limited thereto and the number of microwave waveguides 7 may be one or more than two.

In the firing apparatus 1 of this embodiment, first of all, powdered carbon is continuously fed through furnace 2 to the upper part 3a of firing tube 3 by means of powdered carbon feeding device 4. Thus, a deposited layer 6 of powdered carbon is formed within the upper part 3a of firing tube 3. At the same time, microwaves are applied through microwave waveguides 7 to the top surface of deposited layer 6 of powdered carbon within firing tube 3. Thus, a high-temperature fired layer 11 (see FIG. 2) is formed within deposited layer 6 of powdered carbon. Powder carbon is fired and graphitized by passing though this high-temperature fired layer 11. Furnace 2 is fully heat-insulated by the surrounding heat-insulating materials 9. Moreover, high-temperature fired layer 11 formed within deposited layer 6 of powdered carbon is fully heat-insulated by heat-insulating powdered carbon layer 10 surrounding firing tube 3, so that heat losses during microwave heating are minimized.

In this state, the amount of powdered carbon introduced into furnace 2 and the amount of microwaves applied are kept constant, and high-temperature fired layer 11 is allowed to move downward together with deposited layer 6. This makes it possible to maintain a well-established heat balance in furnace 2 and thereby fire powdered carbon continuously. The powdered carbon having been fired in this manner then passes through the temperature drop region in the lower part of firing tube 3, so that its temperature is rapidly reduced to a non-firing temperature. This fired powdered carbon having a reduced temperature can be withdrawn from the lower end of firing tube 3 by means of fired product withdrawing device 5, without requiring any operation for separating the powder.

Figure 2:
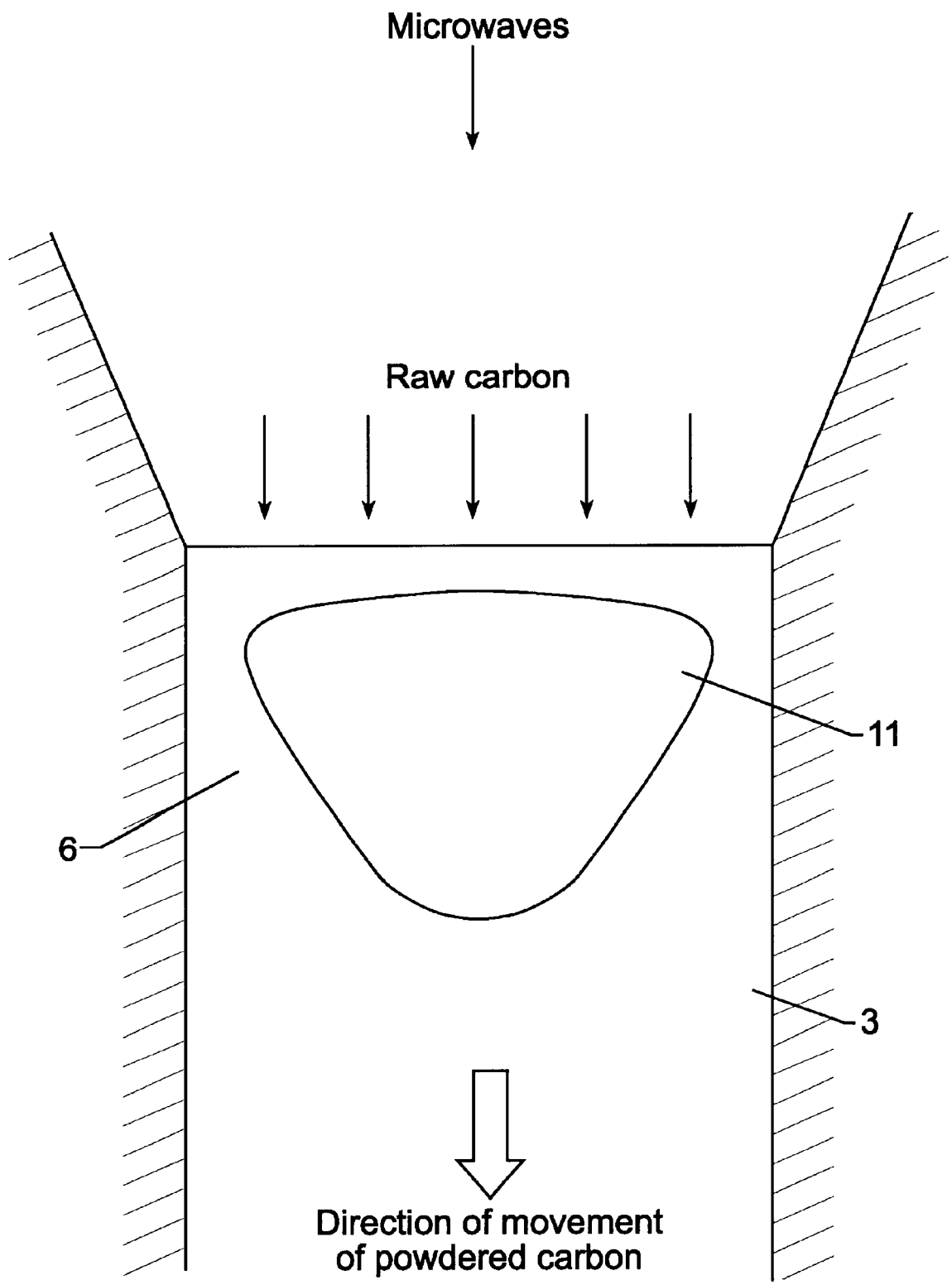
FIG. 2 is a schematic view illustrating a high-temperature fired layer formed within a deposited mass of powdered carbon in the apparatus for the continuous firing of powdered carbon in accordance with the present invention.

The firing temperature required to graphitize powdered carbon is about 3,200° C. Generally, if it is tried to heat the surface of powdered carbon and thereby raise the temperature of its surface layer to this firing temperature, the resulting thermal efficiency will be very low because heat losses caused by radiation from the surface layer to its surroundings are very great. In contrast, this embodiment enables powdered carbon to be fired with high thermal efficiency because, as shown in FIG. 2, the internal part of deposited layer 6 of powdered carbon is directly heated by means of microwaves to form a high-temperature fired layer 11 in an internal zone spaced from the surface layer and free from radiation heat losses.

Furthermore, in this embodiment, raw powdered carbon having an ordinary temperature is continuously fed onto the surface layer of deposited layer 6 of powdered carbon, so that the temperature of the surface layer is not significantly raised. One of the reasons why the temperature of the surface layer is not significantly raised is that the powdered carbon layer extending from high-temperature fired layer 11 to the surface layer has a high void content and low thermal conductivity. Thus, not only heat losses from the surface layer are minimized, but also heat losses from high-temperature fired layer 11 to firing tube 3 are reduced to prevent firing tube 3 from being excessively heated.

In the firing process according to this embodiment, the thickness of the surface layer which does not reach the firing temperature is of the order of several millimeters. Generally, where the fired product of powdered carbon fed into furnace 2 is taken out from above, it is necessary to remove the surface layer with high accuracy after the temperature of the fired product is fully reduced. Since such removal of the surface layer is not easy, the operation for taking out the fired product is very difficult.

In contrast, this embodiment employs the so-called deposition and descent method in which, after powdered carbon is continuously fed and passed through high-temperature fired layer 11, the fired product is continuously cooled and withdrawn from the bottom of furnace 2. Accordingly, the operation for withdrawing the fired product can be easily and rapidly carried out without requiring the above-described removal of the surface layer.

In the method according to this embodiment, high-temperature fired layer 11 is allowed to move downward to the lower side of firing tube 3 in which the heating intensity becomes weaker, so that an appropriate firing temperature can be maintained and a sufficient firing time can be secured.

Figure 3:
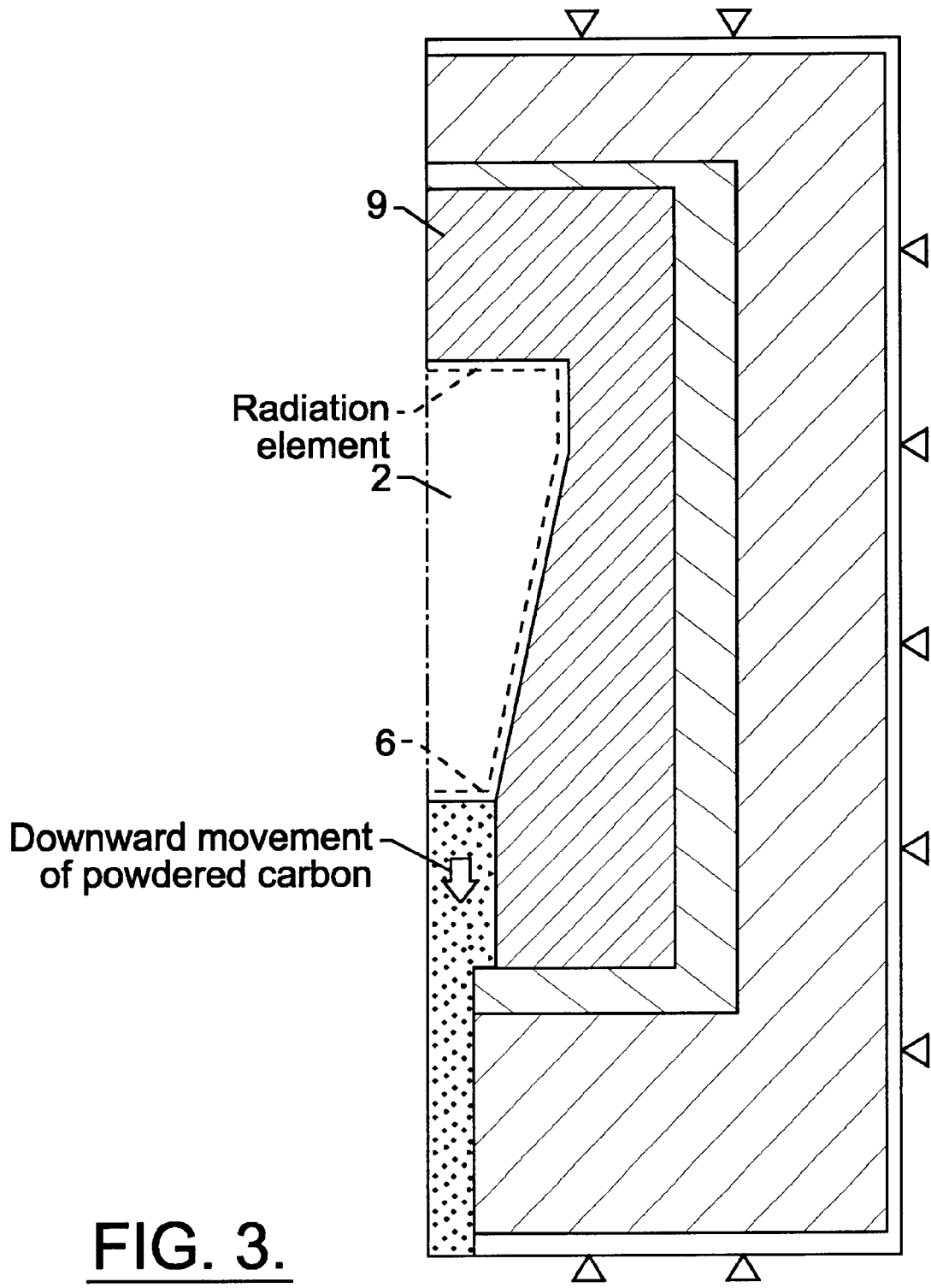
FIG. 3 is a sectional view illustrating an analytical model employed for an analysis made on the basis of the finite element method in order to confirm the presence of the high-temperature fired layer within the deposited mass of powdered carbon as shown in FIG. 2.
Figure 4:
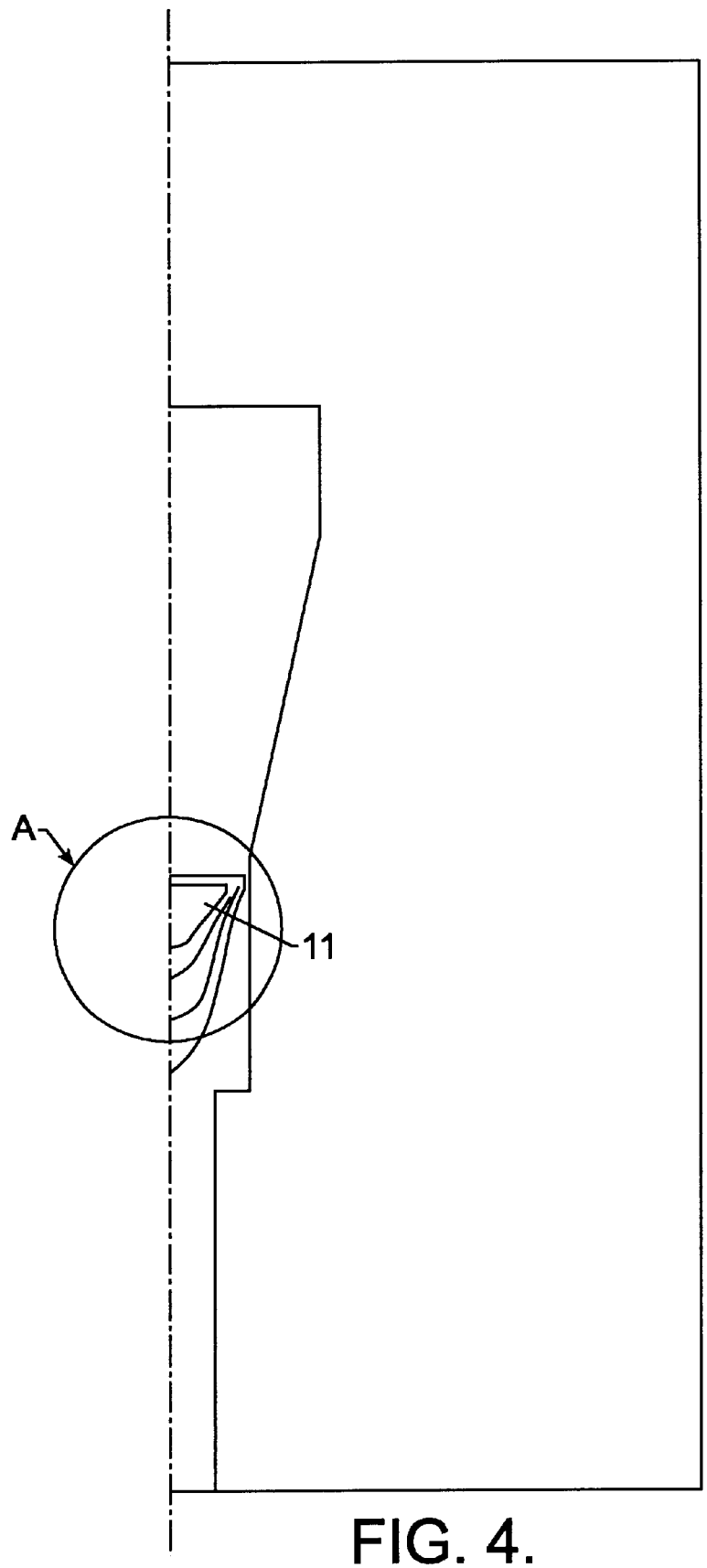
FIG. 4 is a diagram showing the results of an analysis made by using the analytical model illustrated in FIG. 3.
Figure 5:
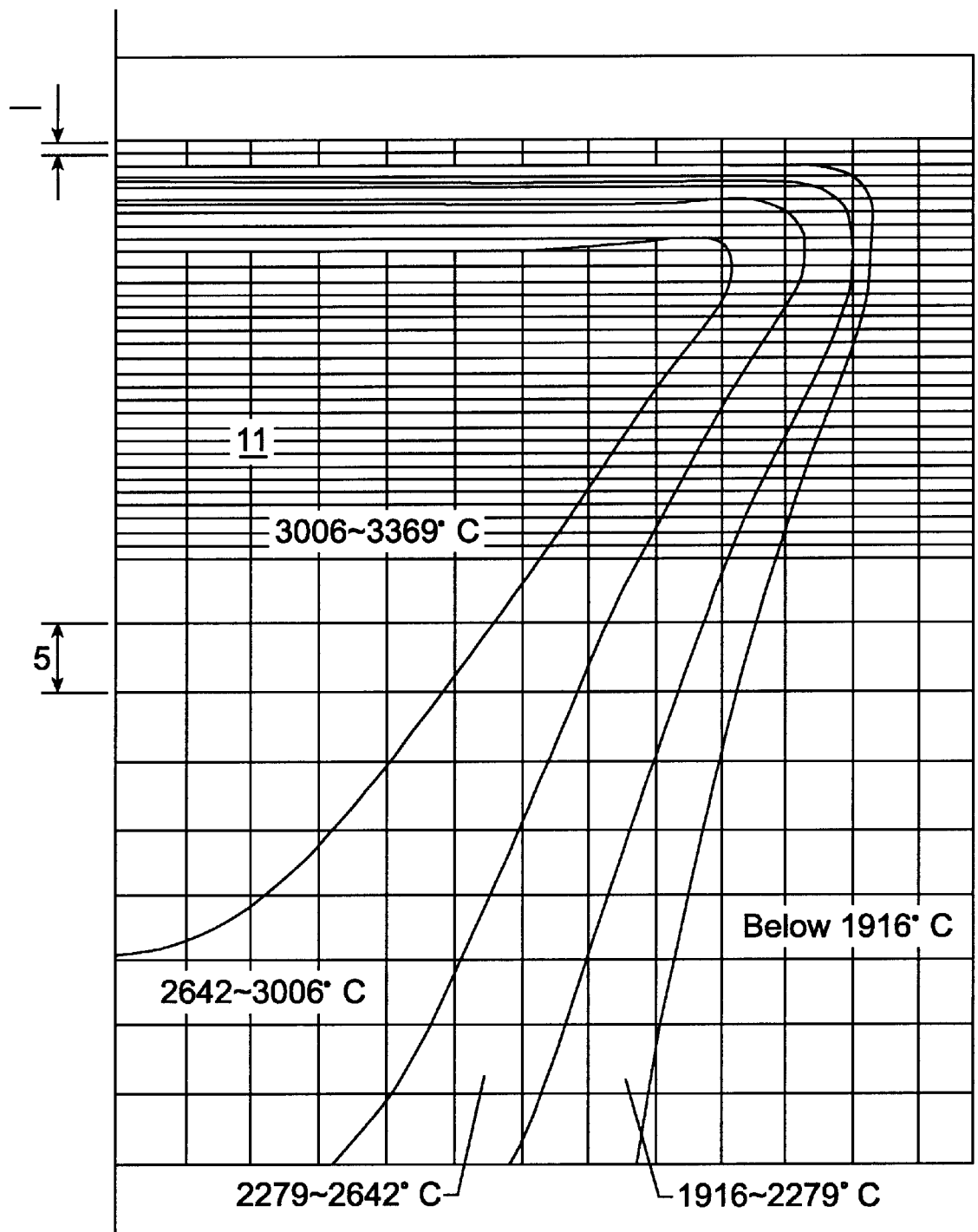
FIG. 5 is a diagram showing, on an enlarged scale, the part enclosed with the circle designated by the arrow A in FIG. 4.
Figure 6:
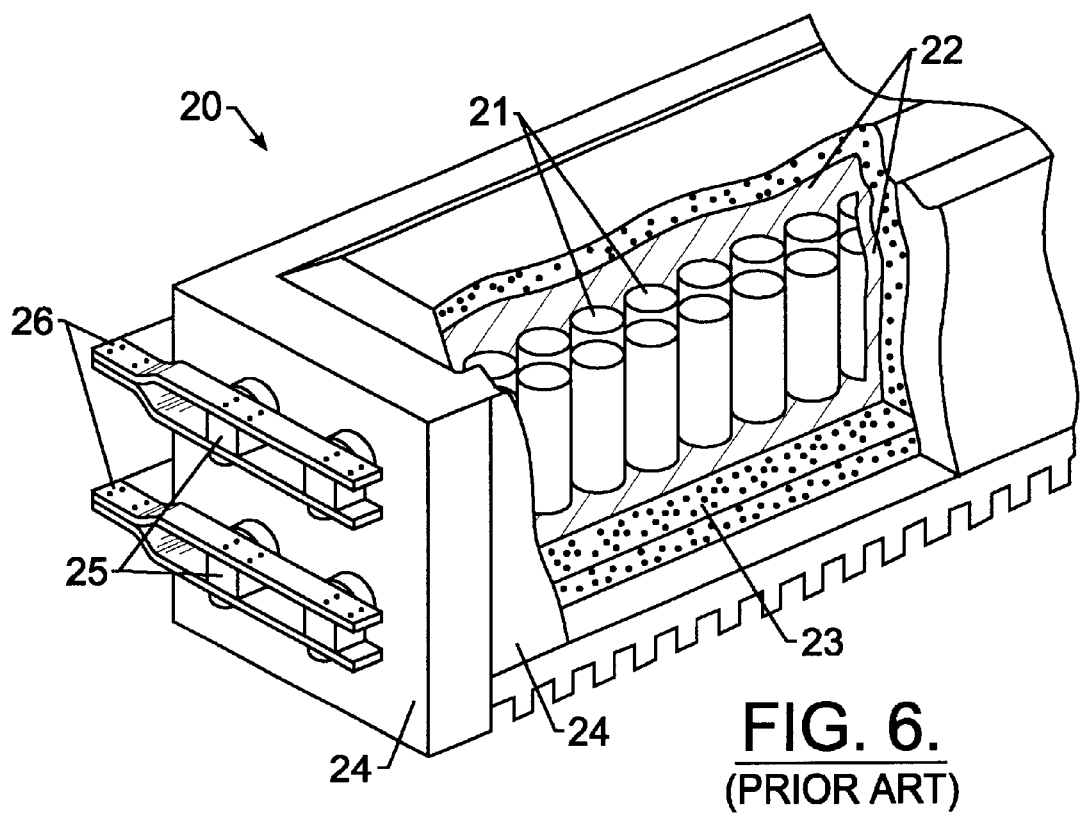
FIG. 6 is a perspective view illustrating a conventional apparatus for the firing of powdered carbon.

FIG. 3 illustrates an analytical model employed for an FEM analysis made in order to confirm the effects produced by the above-described firing apparatus of this embodiment. In this model, heat radiation from the surface of deposited mass 6 of powdered carbon, heat conduction through heat-insulating materials 9 surrounding furnace 2, and the rate of deposition and downward movement of powdered carbon (i.e., mass transfer) are taken into consideration so that thermal properties may be simulated satisfactorily. FIGS. 4 and 5, which show the results of the above-described analysis, indicate temperature distributions within furnace 2. It can be confirmed by these figures that a high-temperature fired layer 11 having reached the graphitization temperature for powdered carbon is formed in an internal zone spaced from the surface layer within firing tube 3 and, moreover, this high-temperature fired layer extends downward so as to maintain that firing temperature for a prolonged period of time. In FIG. 4, the outer surface temperature constraint of the model is 100° C. and the rate of downward movement of powdered carbon (i.e., mass transfer) in the lower middle part is 1 mm/11 seconds. In FIG. 5, graduations indicate the dimensions of the model illustrated in FIG. 4. Narrowly spaced graduations have a width of 1 mm, while widely spaced graduations have a width of 5 mm. Moreover, this figure indicates that the central region indicates high-temperature fired layer 11 and its temperature is in the range of 3,006 to 3,369° C., the temperature of a second adjacent region is in the range of 2,642 to 3,006° C., the temperature of a third adjacent region is in the range of 2,279 to 2,642° C., the temperature of a fourth adjacent region is in the range of 1,916 to 2,279° C., and the temperature of the outermost region is below 1,916° C.

It is to be understood that the present invention is not limited to the above-described embodiment, but is intended to cover all such modifications, changes and additions as fall within the scope of the technical conception thereof.

EXPLOITABILITY IN INDUSTRY

As described above, in the process and apparatus for the continuous firing of powdered carbon in accordance with the present invention, powdered carbon is continuously fired by feeding powdered carbon into a firing tube and applying microwaves to the top surface of a deposited layer of the powdered carbon so as to form a high-temperature fired layer within the deposited layer of the powdered carbon. As a result, the following effects can be produced.

(1) Since the inner part of a deposited layer of powdered carbon is directly heated by means of microwaves to form a high-temperature fired layer within the deposited layer, heat losses during firing can be reduced to cause an improvement in thermal efficiency.

(2) Since powdered carbon continuously fed from above and deposited in the firing tube is fired by allowing it to move downward through the aforesaid high-temperature fired layer, and the resulting fired product is withdrawn from the lower end of the firing tube, it can be continuously fired without requiring the conventional operation for removing the unfired surface layer. Moreover, since the high-temperature fired layer is allowed to move downward to the lower side of the firing tube in which the heating intensity becomes weaker, the temperature of the high-temperature fired layer is prevented from being excessively raised. Thus, an appropriate firing temperature can be maintained and, therefore, a sufficient firing time can be secured.

(3) On the heated side, the surface temperature of the deposited powdered carbon can be kept lower by feeding raw powdered carbon continuously to the upper end of the firing tube. Thus, radiation heat losses from the surface of the powdered carbon can be reduced.

(4) By disposing a heat-insulating powdered carbon layer around the high-temperature fired layer, not only heat losses from the high-temperature fired layer to its surroundings can be reduced, but also the temperature of the firing tube can be maintained below the temperature at which the desired endurance time of the firing tube is achieved. Moreover, since the heat-insulating powdered carbon layer is formed by using powdered carbon equivalent to the fired product, no other special heat-insulating material is required to an economic advantage.

The contents of the specification, drawings, abstract and claims of Japanese Patent Application No. 80649/'98 filed on May 27, 1998 are incorporated herein, in their entirety, by reference.

What is claimed is:

1. A process for the continuous firing of powdered carbon which comprises firing powdered carbon continuously by feeding powdered carbon into a firing tube and applying microwaves along a feeding direction of the powdered carbon to the top surface of a deposited layer of the powdered carbon so as to form a graphitized carbon layer within the deposited layer.

2. A process for the continuous firing of powdered carbon as claimed in claim 1 wherein the powdered carbon is continuously fed into the firing tube from above and allowed to move downward through the high-temperature fired layer, and a fired product of powdered carbon is continuously withdrawn from the lower end of the firing tube.

3. An apparatus for the continuous firing of powdered carbon which includes a firing tube disposed within a furnace, a powdered carbon feeding device for feeding powdered carbon continuously into the firing tube through one end thereof, a fired product withdrawing device for withdrawing a fired product of powdered carbon continuously from the other end of the firing tube, and one or more microwave waveguides extending into the furnace and serving to apply microwaves to the top surface of a deposited layer of powdered carbon fed into the firing tube and deposited therein, whereby the application of microwaves causes a graphitized carbon layer to be formed within the deposited layer of powdered carbon.

* * * * *